(12) United States Patent
Roth et al.

(10) Patent No.: US 7,299,636 B2
(45) Date of Patent: Nov. 27, 2007

(54) EXTENDIBLE EXHAUST NOZZLE BELL FOR A ROCKET ENGINE

(75) Inventors: Martin Roth, deceased, late of Taufkirchen (DE); by Rita Roth, legal representative, Taufkirchen (DE); Franz Sperber, Kolbermoor (DE)

(73) Assignee: Eads Space Transportation GmbH, Bremen (DE)

( * ) Notice: Subject to any disclaimer, the term of this patent is extended or adjusted under 35 U.S.C. 154(b) by 723 days.

(21) Appl. No.: 10/803,899

(22) Filed: Mar. 19, 2004

(65) Prior Publication Data
US 2005/0016179 A1    Jan. 27, 2005

(30) Foreign Application Priority Data
Mar. 21, 2003    (DE) .............................. 103 12 776

(51) Int. Cl.
*F02K 1/00*    (2006.01)
(52) U.S. Cl. ....................................... 60/771; 60/200.1
(58) Field of Classification Search ............... 60/200.1, 60/771; 239/265.19
See application file for complete search history.

(56) References Cited

U.S. PATENT DOCUMENTS

| | | | | | |
|---|---|---|---|---|---|
| 3,565,208 | A | * | 2/1971 | Millman et al. ............ | 181/216 |
| 4,213,566 | A | * | 7/1980 | Miltenberger .......... | 239/265.43 |
| 4,313,567 | A | | 2/1982 | Feight | |
| 4,383,407 | A | * | 5/1983 | Inman .......................... | 60/771 |
| 4,489,889 | A | * | 12/1984 | Inman .................... | 239/265.33 |
| 4,676,436 | A | * | 6/1987 | Willis ..................... | 239/265.33 |
| 4,779,799 | A | * | 10/1988 | Jencek ................... | 239/265.19 |
| 5,282,576 | A | * | 2/1994 | Chatenet et al. ........ | 239/265.33 |
| 5,641,123 | A | * | 6/1997 | Kishimoto et al. ..... | 239/265.15 |
| 6,205,772 | B1 | * | 3/2001 | Perrier et al. ................. | 60/770 |
| 6,418,710 | B1 | * | 7/2002 | Perrier et al. ................. | 60/771 |

FOREIGN PATENT DOCUMENTS

| | | |
|---|---|---|
| EP | 0516519 | 12/1992 |
| EP | 0661436 | 7/1995 |
| FR | 2622931 | 5/1989 |
| RU | 2044150 | 9/1995 |

\* cited by examiner

*Primary Examiner*—William H. Rodríguez
(74) *Attorney, Agent, or Firm*—Greenblum & Bernstein, P.L.C.

(57) ABSTRACT

An exhaust nozzle bell for a rocket engine including a first part arranged on a motor of the rocket engine, and a second part coupled to the first part. The second part having a stowed position in which the second part surrounds the first part and is positioned closer to the motor, and an operating position in which the first part and the second part form a continuous shape and the second part is arranged farther from the motor. Moreover, the nozzle can include an extension mechanism structured and arranged to extend the second part from the stowed position to the operating position, the extension mechanism including a plurality of swiveling extension arms, wherein the extension arms have first and second ends. Furthermore, each of the extension arms comprise one of a sliding and rolling element on an end facing the second part of the exhaust nozzle bell. The instant abstract is neither intended to define the invention disclosed in this specification nor intended to limit the scope of the invention in any way.

24 Claims, 4 Drawing Sheets b) Extended Position II a) Stowed Position I

EXTENDIBLE EXHAUST NOZZLE BELL FOR A ROCKET ENGINE

CROSS-REFERENCE TO RELATED APPLICATIONS

The present application claims priority under 35 U.S.C. § 119 of German Patent Application No. 103 12 776.3, filed on Mar. 21, 2003, the disclosure of which is expressly incorporated by reference herein in its entirety.

BACKGROUND OF THE INVENTION

1. Field of the Invention

The invention relates to an extendible exhaust nozzle bell for a rocket engine of an aircraft or spacecraft. In particular, an extendible exhaust nozzle bell for a rocket engine of an aircraft or spacecraft which comprises a first part featuring a quasi-conical shape with smaller diameter fixedly arranged on a motor of a rocket engine and a second part featuring a quasi-conical shape with greater diameter arranged in a flexible manner with respect to this first part.

2. Discussion of Background Information

An extendible exhaust nozzle bell for a rocket engine of an aircraft or spacecraft is known from EP 0 516 519 B1 which comprises a first part of a quasi-conical shape with smaller diameter fixedly arranged on the motor of the rocket engine and a second part of a quasi-conical shape with greater diameter arranged in a flexible manner with respect to this first part. In a front stowed position relative to the flight direction the second part of the exhaust nozzle bell is arranged surrounding the first part located nearer to the rocket motor, and in a rear operating position relative to the direction of flight continuing the shape of the second part it is arranged further away from the rocket motor. To extend the second part of the exhaust nozzle bell from the stowed position into the operating position, an extension mechanism is provided that comprises several swiveling extension arms distributed over the circumference of the exhaust nozzle bell, which extension arms are coupled between the first part and the second part of the exhaust nozzle bell and connected in a hinged manner at a first end to a support structure provided on the outside of the first part of the exhaust nozzle bell. With the known exhaust nozzle bell, the extension arms are supported in a swiveling manner around an axis of rotation provided in the circumferential direction of the exhaust nozzle bell on the support structure attached to the first part of the exhaust nozzle bell in a radial plane containing the longitudinal axis of the rocket engine, and coupled in a pivoted manner on their second end to a tie rod that in turn is coupled in a pivoted manner with the other end to a point of application of force provided in the region of the front end of the second part of the exhaust nozzle bell on its outside. In the radial plane containing the longitudinal axis of the rocket engine the extension arms have a shape curved in an arched manner towards the front end of the second part of the exhaust nozzle bell, which shape during the extension of the second part of the exhaust nozzle bell permits a swiveling movement over a certain angle area encompassing the front end of the same.

Extendible exhaust nozzle bells for a rocket engine of an aircraft or spacecraft are known from U.S. Pat. No. 4,313,567 and U.S. Pat. No. 4,383,407, which in a similar manner comprise a fixedly arranged first part of a quasi-conical shape with smaller diameter and a second part of a quasi-conical shape with greater diameter arranged with in a flexible manner respect to this first part. To extend the second part of the exhaust nozzle bell from a front stowed position relative to the flight direction into a rear operating position relative to the flight direction, an extension mechanism is provided that comprises several transport screws arranged distributed over the circumference of the exhaust nozzle bell and coupled between the first and the second part of the exhaust nozzle bell. These transport screws are arranged parallel to the longitudinal axis of the rocket engine and can be driven via a rotary drive so that during their rotation the second part of the exhaust nozzle bell is extended towards the rear parallel to the longitudinal axis of the rocket engine.

SUMMARY OF THE INVENTION

The present invention forms an extendible exhaust nozzle bell with an extension mechanism of the smallest possible mass, that can be constructed as simply as possible, and that operates reliably.

The instant invention provides an extendible exhaust nozzle bell and, in particular, an extendible exhaust nozzle bell for a rocket engine of an aircraft or spacecraft which includes a first part featuring a quasi-conical shape with smaller diameter fixedly arranged on the motor of the rocket engine and a second part featuring a quasi-conical shape with greater diameter arranged in a flexible manner with respect to this first part. Moreover, in a front stowed position the second part of the exhaust nozzle bell surrounding the first part of the exhaust nozzle bell is located nearer to the rocket motor, and in a rear operating position continuing the shape of the first part it is arranged further away from the rocket motor. Furthermore the exhaust nozzle bell includes an extension mechanism for extending the second part of the exhaust nozzle bell from the stowed position into the operating position. Additionally, the extension mechanism includes several swiveling extension arms distributed over the circumference of the exhaust nozzle bell, and coupled between the first part and the second part of the exhaust nozzle bell, which extension arms are connected in a hinged manner at a first end to a support structure provided on the outside of the first part of the exhaust nozzle bell. Furthermore, the extension arms are arranged on their second end in a displaceable manner with respect to the inside of the second part of the exhaust nozzle bell and can be swiveled while reducing the radial distance of their second end to the first part of the exhaust nozzle bell, so that the second part of the exhaust nozzle bell can be extended in the direction of the rear operating position during swiveling in of the extension arms to the first part of the exhaust nozzle bell following the quasi-conical shape of the second part of the exhaust nozzle bell.

Advantageous further developments of the extendible exhaust nozzle bell can include the extension arms having a sliding or rolling element on their end facing the second part of the exhaust nozzle bell, which sliding or rolling element is provided for a sliding or rolling movement with respect to the inside of the second part of the exhaust nozzle bell while swiveling in the extension arms during the extension of the second part of the exhaust nozzle bell. Moreover, the extension arms can be supported on their first end around a hinged axle arranged in the circumferential direction of the exhaust nozzle bell and can be swiveled in a radial plane containing the longitudinal axis of the rocket engine. Furthermore, a first activating device coupled with the extension arms and can be provided for swiveling in the extension arms, and a second activating device coupled with the second part of the exhaust nozzle bell can be provided for moving the same in the longitudinal direction of the rocket engine from the stowed position into the operating position. Additionally the first activating device can contain an actuator and a transport screw driven by the actuator and coupled with the extension arm for a swiveling movement of the same, which transport screw is changeable in its effective length. Moreover, the first activating device can contain an actuator and a tension cable driven by the actuator and coupled with the extension arm for a swiveling movement of the same, and a spring-loaded device acting against the tension of the tension cable on the extension arm. Furthermore, the second activating device can contain an actuator, a rope drum driven by the actuator and a tension cable for a transport of the same wound on the rope drum and coupled with the second part of the exhaust nozzle bell. Moreover, the first and/or second activating device can contain a pivoted collecting ring surrounding the first part of the exhaust nozzle bell in the circumferential direction that can be driven by an actuator for a rotation of the same, and tension cables which are placed around the collecting ring and are changeable in their effective length during the rotation of the same, and which are coupled with the extension arms or the second part of the exhaust nozzle bell for their activation. Additionally, a central drive can be provided for the collecting ring. Moreover, the extension arms can be embodied as triangular guides tapering from their first end towards their second end. Additionally, guide devices for a longitudinal guiding of the second part of the exhaust nozzle bell on a last part of the extension movement from the stowed position into the operating position can be provided coupled between the first part and the second part of the exhaust nozzle bell. Moreover, the guide devices can contain guide rollers or sliders mounted on the front end of the second part of the exhaust nozzle bell and guide rails mounted on a support structure on the first part of the exhaust nozzle bell to accept and guide the guide rollers or sliders.

Through the invention an extendible exhaust nozzle bell for a rocket engine of an aircraft or spacecraft is created, which exhaust nozzle bell comprises a first part featuring a quasi-conical shape with smaller diameter fixedly arranged on the motor of the rocket engine and a second part featuring a quasi-conical shape with greater diameter arranged in a flexible manner with respect to the first part, whereby in a front stowed position (relative to the flight direction of the aircraft or spacecraft) the second part surrounding the first part of the exhaust nozzle bell is located nearer to the rocket motor and in a rear operating position (relative to the flight direction of the aircraft or spacecraft) continuing the first part is arranged further away from the rocket motor, and with an extension mechanism for extending the second part of the exhaust nozzle bell from the stowed position into the operating position, whereby the extension mechanism comprises several swiveling extension arms distributed over the circumference of the exhaust nozzle bell and coupled between the first part and the second part of the exhaust nozzle bell, which extension arms are connected in a hinged manner on a first end to a support structure provided on the outside of the first part of the exhaust nozzle bell. According to the invention it is provided that the extension arms are arranged on their second end in a displaceable manner with respect to the inside of the second part of the exhaust nozzle bell and can be swiveled while reducing the radial distance of their second end to the first part of the exhaust nozzle bell, so that the second part of the exhaust nozzle bell can be extended in the direction of the rear operating position during swiveling in of the extension arms to the first part of the exhaust nozzle bell following the quasi-conical shape of the second part of the exhaust nozzle bell.

It is preferably provided that the extension arms feature a sliding or rolling element on their second end facing the second part of the exhaust nozzle bell, which sliding or rolling element is provided for a sliding or rolling movement with respect to the inside of the second part of the exhaust nozzle bell while swiveling in the extension arms during the extension of the second part of the exhaust nozzle bell.

Preferably the extension arms are supported on their first end around a hinged axle running in the circumferential direction of the exhaust nozzle bell and can be swiveled in a radial plane containing the longitudinal axis of the rocket engine.

Preferably a first activating device coupled with the extension arms is provided for swiveling in the extension arms, and a second activating device coupled with the second part of the exhaust nozzle bell is provided for moving the same in the longitudinal direction of the rocket engine from the stowed position into the operating position.

According to a preferred embodiment of the exhaust nozzle bell according to the invention, the first activating device contains an actuator and a transport screw driven by the actuator and coupled with the extension arm for a swiveling movement of the same, which transport screw is changeable in its effective length.

According to another preferred embodiment, the first activating device contains an actuator and a tension cable driven by the actuator and coupled with the extension arm for a swiveling movement of the same, and a spring-loaded device acting against the tension of the tension cable on the extension arm.

According to a preferred embodiment of the invention, it is provided that the second activating device comprises an actuator, a rope drum driven by the actuator and a tension cable for a transport of the same wound on the rope drum and coupled with the second part of the exhaust nozzle bell. Preferably several of these tension cables are provided distributed over the circumference of the exhaust nozzle bell.

Furthermore, according to a preferred embodiment of the invention it can be provided that the first and/or second activating device contains a pivoted collecting ring surrounding the first part of the exhaust nozzle bell in the circumferential direction that can be driven by an actuator for a rotation of the same and tension cables placed around the collecting ring, which tension cables are changeable in their effective length during the rotation of the same, which are coupled with the extension arms or the second part of the exhaust nozzle bell for their activation.

Preferably a central drive or a central actuator is provided for the collecting ring. This central drive or actuator can be provided in particular in a redundant manner.

Preferably the extension arms are embodied as triangular guides tapering from their first end towards their second end.

According to a preferred further development of the exhaust nozzle bell according to the invention, guide devices for a longitudinal guiding of the second part of the exhaust nozzle bell on a last part of the extension movement from the stowed position into the operating position are provided coupled between the first part and the second part of the exhaust nozzle bell.

The guide devices can hereby contain guide rollers or sliders mounted on the front end of the second part of the exhaust nozzle bell and guide rails mounted on a support structure on the first part of the exhaust nozzle bell to accept and guide the guide rollers or sliders.

One aspect of the invention includes an extendible exhaust nozzle bell for a rocket engine of one of an aircraft and spacecraft. The nozzle bell includes a first part, having a quasi-conical shape, fixedly arranged on a motor of the rocket engine and a second, having a quasi-conical shape with a greater diameter than the first part, arranged in a flexible manner with respect to the first part. The second part having a stowed position in which the second part surrounds the first part and is positioned closer to the motor, and an operating position in which the first part and the second part form a continuous shape and the second part is arranged farther from the motor. The nozzle further includes an extension mechanism structured and arranged to extend the second part from the stowed position to the operating position, the extension mechanism including a plurality of swiveling extension arms distributed over a circumference of the first part, and coupled between the first part and the second part, wherein the extension arms have first and second ends, such that the first ends are hingedly connected to a support structure provided on an outside of the first part. Moreover, the second ends are displaceably arranged with respect to an inside of the second part and configured to be swivelable while reducing a radial distance of the second ends to the first part.

In a further aspect of the invention the second part can be extended in a direction of the operating position during swiveling of the extension arms to the first part and the second ends of the extension arms follow the quasi-conical shape of the second part. Moreover, the extension arms can include one of a sliding and rolling element on an end facing the second part, and the sliding and rolling element can be structured and arranged for a sliding or rolling movement with respect to an inside of the second part while swiveling the extension arms during the extension of the second part. Furthermore, the extension arms can be supported on the first end about a hinged axle arranged in a circumferential direction and can be configured to be swiveled in a radial plane containing a longitudinal axis of the rocket engine. Additionally, the exhaust nozzle bell can include a first activating device, coupled with the extension arms, structured and arranged for swiveling the extension arms and a second activating device, coupled with the second part, structured and arranged to move the exhaust nozzle bell in the longitudinal direction of the rocket engine from the stowed position into the operating position. Moreover, the first activating device can contain an actuator and a transport screw driven by the actuator and coupled with the extension arm for a swiveling movement of the extension arm to change an effective length. Furthermore, the first activating device can contain an actuator and a tension cable driven by the actuator and coupled with the extension arm for a swiveling movement of the extension arm, and a spring-loaded device acting against a tension of the tension cable on the extension arm. Moreover, the second activating device can contain an actuator, a rope drum driven by the actuator, and a tension cable, the tension cable being wound on the rope drum and coupled with the second part. Additionally, at least one of the first and second activating devices can include a pivoted collecting ring surrounding the first part in the circumferential direction that can be driven by an actuator for a rotation of the collection ring, and tension cables positioned around the collecting ring, the tension cables having a changeable effective length during the rotation of the collecting ring, and which are coupled with the extension arms or the second part. Furthermore, the collecting ring can further include a central drive. Moreover, the extension arms can be configured as triangular guides tapering from a first end towards a second end. Additionally, guide devices can be structured and arranged for a longitudinal guiding of the second part on a last part of an extension movement from the stowed position into the operating position are coupled between the first part and the second part. Furthermore, the guide devices can include one of guide rollers and sliders mounted on a front end of the second part and guide rails mounted on a support structure on the first part to accept and guide one of the guide rollers and sliders.

Another aspect of the invention includes an exhaust nozzle bell for a rocket engine including a first part fixedly arranged on a motor of the rocket engine, and a second part displaceably coupled to the first part. The second part having a stowed position in which the second part surrounds the first part and is positioned closer to the motor, and an operating position in which the first part and the second part form a continuous shape and the second part is arranged farther from the motor. Moreover, the nozzle can include an extension mechanism structured and arranged to extend the second part from the stowed position to the operating position, the extension mechanism including a plurality of swiveling extension arms, wherein the extension arms have first and second ends. Furthermore, each of the extension arms comprise one of a sliding and rolling element on an end facing the second part, and the sliding and rolling element is structured and arranged for a sliding or rolling movement with respect to an inside of the second part. In a further aspect of the invention the extension arms can include one of a sliding and rolling element on an end facing the second part, and the sliding and rolling element can be structured and arranged for a sliding or rolling movement with respect to an inside of the second part while swiveling the extension arms during the extension of the second part. Furthermore, the extension arms can be supported on the first end about a hinged axle arranged in a circumferential direction of the exhaust nozzle bell and can be configured to be swiveled in a radial plane containing a longitudinal axis of the rocket engine. Additionally, the exhaust nozzle bell can include a first activating device, coupled with the extension arms, structured and arranged for swiveling the extension arms and a second activating device, coupled with the second part, structured and arranged to move the exhaust nozzle bell in the longitudinal direction of the rocket engine from the stowed position into the operating position. Moreover, the first activating device can contain an actuator and a transport screw driven by the actuator and coupled with the extension arm for a swiveling movement of the extension arm to change an effective length. Furthermore, the first activating device can contain an actuator and a tension cable driven by the actuator and coupled with the extension arm for a swiveling movement of the extension arm, and a spring-loaded device acting against a tension of the tension cable on the extension arm. Moreover, the second activating device can contain an actuator, a rope drum driven by the actuator, and a tension cable, the tension cable being wound on the rope drum and coupled with the second part. Additionally, at least one of the first and second activating devices can include a pivoted collecting ring surrounding the first part in the circumferential direction that can be driven by an actuator for a rotation of the collection ring, and tension cables positioned around the collecting ring, the tension cables having a changeable effective length during the rotation of the collecting ring, and which are coupled with the extension arms or the second part. Furthermore, the collecting ring can further include a central drive. Moreover, the extension arms can be configured as triangular guides tapering from a first end towards a second end. Additionally, guide devices can be structured and arranged for a longitudinal guiding of the second part on a last part of an extension movement from the stowed position into the operating position are coupled between the first part and the second part. Furthermore, the guide devices can include one of guide rollers and sliders mounted on a front end of the second part and guide rails mounted on a support structure on the first part to accept and guide one of the guide rollers and sliders.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 4:
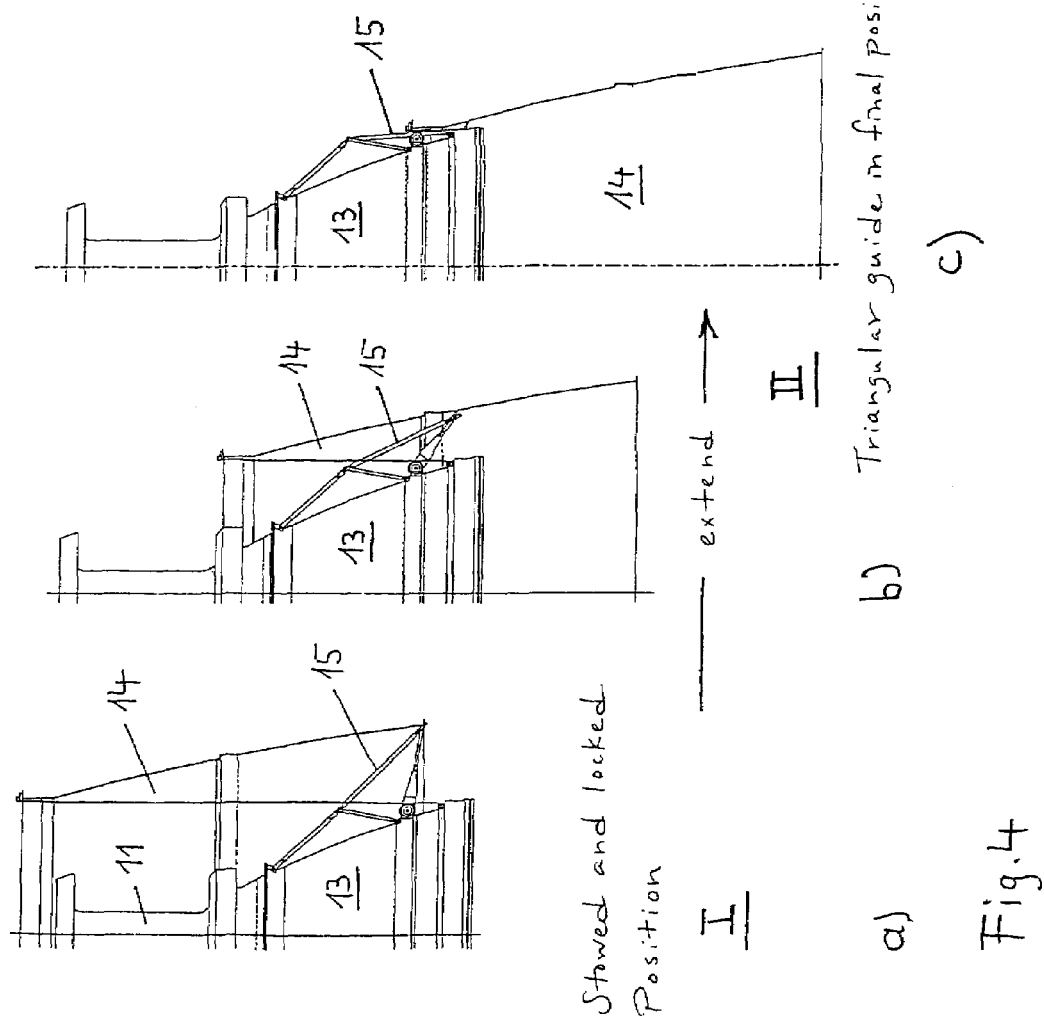
FIGS. 4a, 4b, and 4c show three different phases of the extension movement from the stowed position I into the operating position II for the first exemplary embodiment shown in FIG. 1 of the extendible exhaust nozzle bell according to the invention in a partially sectional side partial view.

In the exemplary embodiments of an extendible exhaust nozzle bell for a rocket engine of an aircraft or spacecraft shown in the figures, the reference number 11 is directed to a throat of a combustion chamber of a motor (not shown) of a rocket engine for an aircraft or spacecraft. An exhaust nozzle bell labeled as a whole with the reference number 12 is arranged on the combustion chamber throat 11. The nozzle bell 12 is used in a known manner to expand, in a controlled manner, the combustion gases streaming out backwards at a high speed from the combustion chamber throat 11 such that the speed of the combustion gases is reduced to obtain a maximum impulse transmission to the aircraft or spacecraft for the purpose of its propulsion. To this end, a substantial expansion ratio is necessary between the cross section of the combustion chamber throat 11, from which the combustion gases enter the exhaust nozzle bell 12 at its front end, and the cross-sectional area of the rear opening of the exhaust nozzle bell 12, where the exhaust gases emerge. Allowing for an optimal curved shape of the exhaust nozzle bell 12, this means a considerable length of the same. To keep a space required for the exhaust nozzle bell 12 within limits, the exhaust nozzle is therefore provided in a divided and extendible form. The exhaust nozzle bell 12 includes a first part 13 fixedly arranged at the combustion chamber throat 11 and a second part 14 arranged in a flexible manner with respect to the first part 13. Each of the parts respectively include a quasi-conical shape diverging to the rear with respect to the flight direction, as can be seen in particular from FIGS. 1 and 4.

In a front stowed position I that is shown respectively in FIGS. 1a), 2, 3, and 4a), the second part 14 of the exhaust nozzle bell 12 surrounding the first part 13 of the exhaust nozzle bell 12 is located closer to the rocket motor, thus further forward with respect to the flight direction, and in a rear operating position II that is shown in FIGS. 1b), 4c) and 5, continuing the first part 13 of the exhaust nozzle bell 12 is arranged further away from the rocket motor, thus further back with respect to the flight direction. In this rear operating position lithe second part 14 of the exhaust nozzle bell 12 can be firmly locked by a locking mechanism shown in FIG. 5 and labeled as a whole with the reference number 50.

Figure 1:
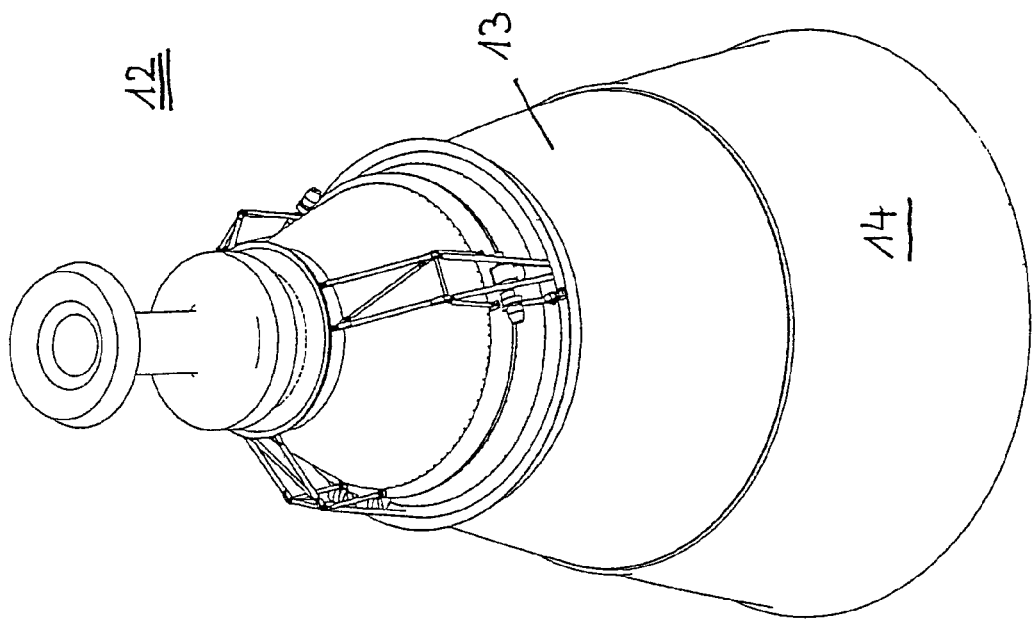
FIGS. 1a and 1b show a perspective, partially sectional view of an extendible exhaust nozzle bell of a rocket engine in a stowed position I and an operating position II according to a first exemplary embodiment of the invention.
Figure 1:
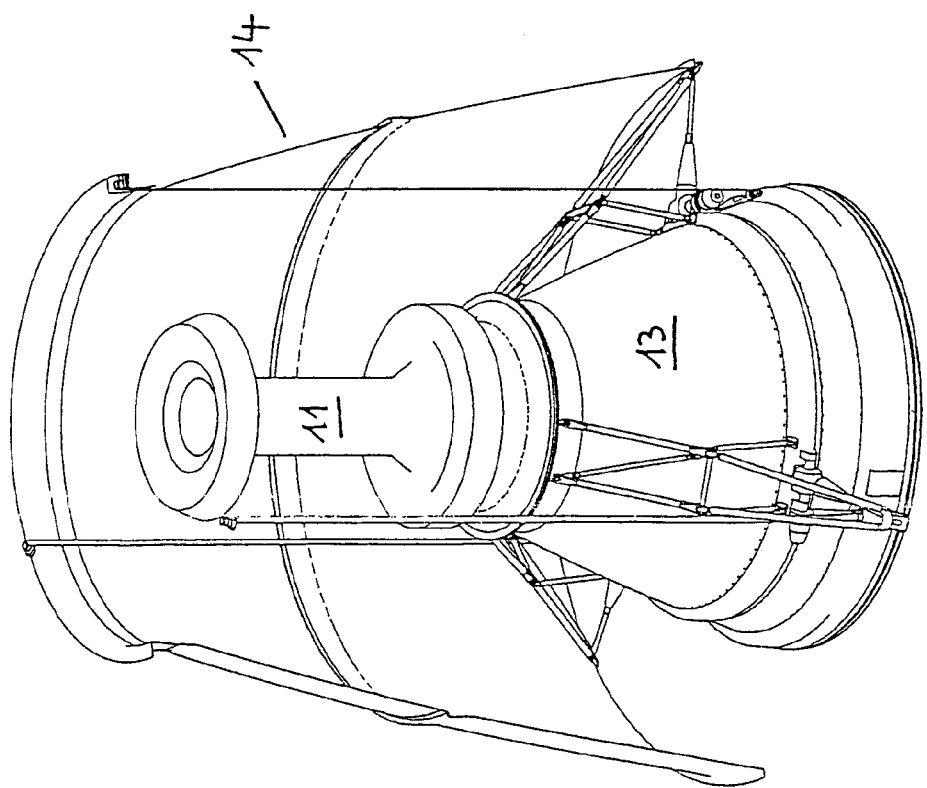
Figure 2:
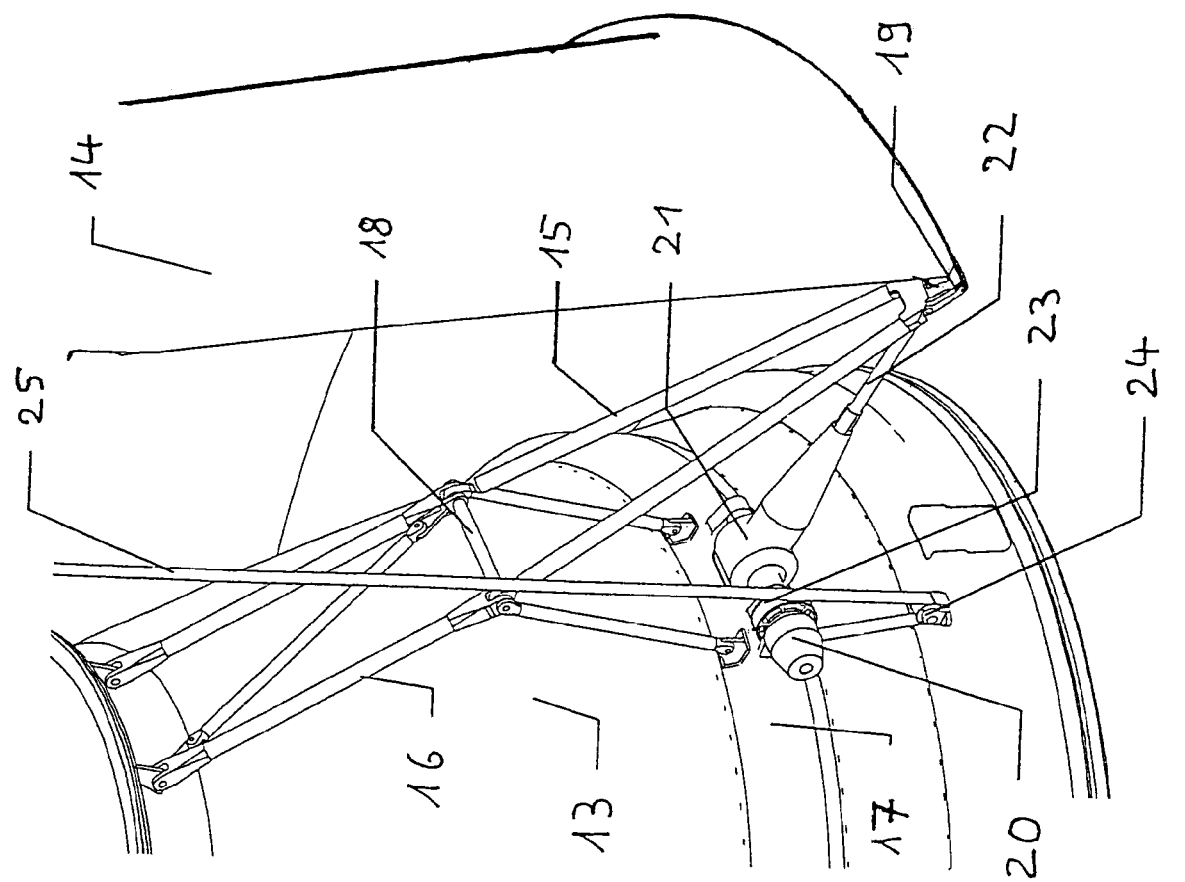
FIG. 2 shows an enlarged perspective partially sectional partial view of the first exemplary embodiment of the exhaust nozzle bell according to the invention in the stowed position I shown in FIG. 1.
Figure 3:
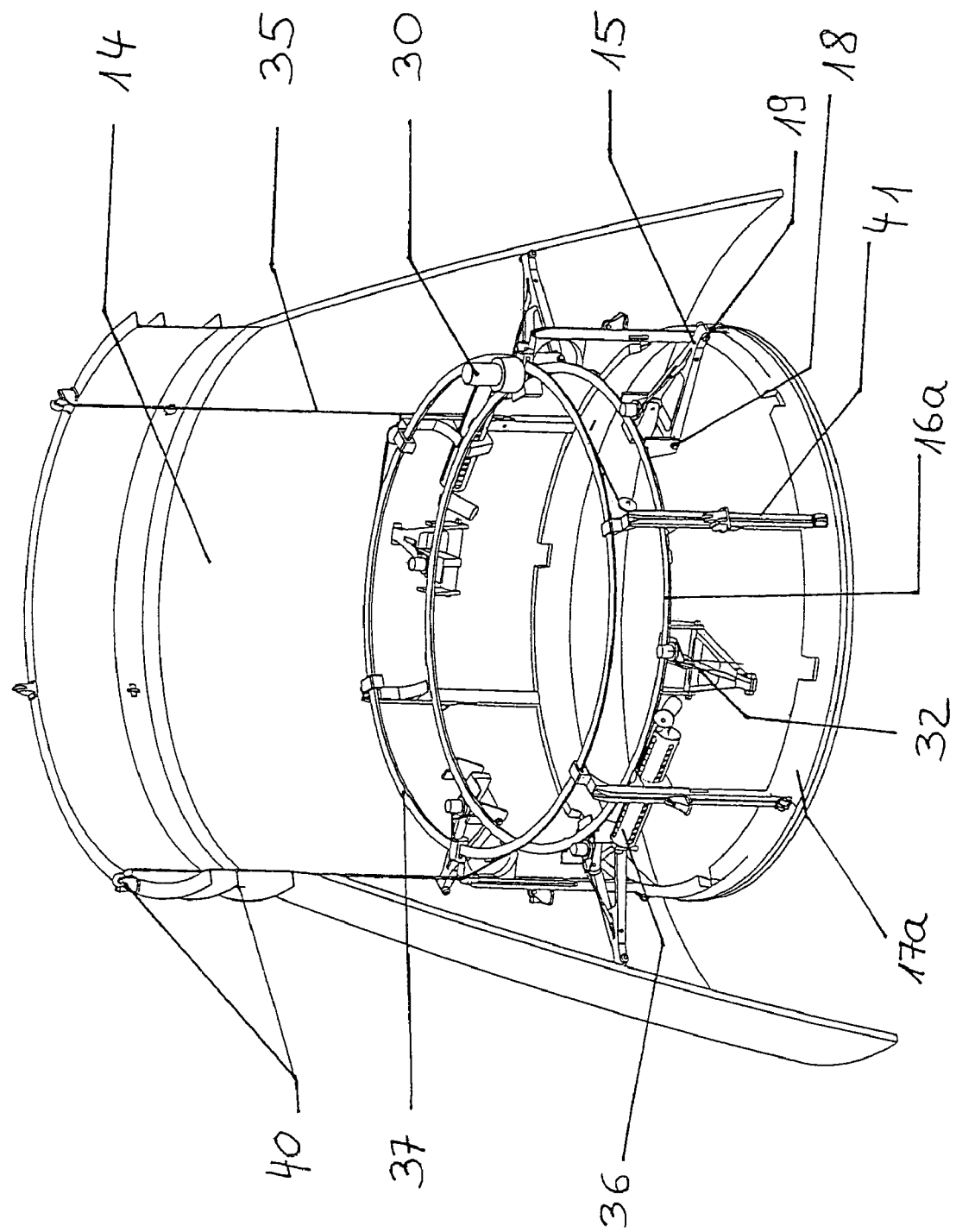
FIG. 3 shows a perspective, partially sectional view of a part of an extendible exhaust nozzle bell of a rocket engine together with an extension mechanism in stowed position I according to a second exemplary embodiment of the invention.

An extension mechanism is used to extend the second part 14 of the exhaust nozzle bell 12 from the stowed position I into the operating position II, which mechanism comprises several swiveling extension arms 15, namely 3 in the exemplary embodiment shown in FIGS. 1 and 2, 6 in the exemplary embodiment shown in FIG. 3, which extension arms are coupled between the first part 13 and the second part 14 of the exhaust nozzle bell 12 and distributed over the circumference of the exhaust nozzle bell 12. They are connected in a hinged manner at a first end to a support structure 16, 17 or 16a, 17a provided on the outside of the first part 13 of the exhaust nozzle bell 12. This hinged connection is formed by a hinged axle 18 running in the circumferential direction of the exhaust nozzle bell 12 so that the extension arms 15 can be swiveled in a radial plane containing the longitudinal axis of the rocket engine over a predetermined area.

As shown in FIGS. 4a) through 4c), when the extension arms 15 are swiveled in, the radial distance from their second end to the first part 13 of the exhaust nozzle bell 12 is reduced, so that when the extension arms 15 are swiveled in to the first part 13 following the quasi-conical shape of the second part 14, the second part 14 of the exhaust nozzle bell 12 can be extended from the stowed position I shown in FIG. 4a) to the operating position II shown in FIG. 4c). To this end the extension arms 15 feature a sliding or rolling element 19 on their second end facing the second part 14 of the exhaust nozzle bell 12, which sliding or rolling element executes a sliding or rolling movement with respect to the inside of the second part 14 of the exhaust nozzle bell 12 during the extension of the second part 14.

To swivel in the extension arms 15, a first activating device coupled to the extension arms 5 is provided and to move the second part 14 of the exhaust nozzle bell 12 from the stowed position I into the operating position II, a second activating device coupled therewith is provided.

In the first exemplary embodiment shown in detail in FIG. 2, the mentioned first activating device comprises an actuator 20, e.g., in the form of a stepping motor with a downstream planetary gearing, and a transport screw 22 that is coupled via an intermediate gearing 21 with the actuator 20 for drive by this and on the other hand with the extension arm 15 near to its second end. The transport screw 22 is changeable in its effective length by being driven via the actuator 20 for a swiveling movement of the extension arm 15.

In the second exemplary embodiment of the exhaust nozzle bell according to the invention shown in FIG. 3, the first activating device provided for swiveling the extension arms 15 in turn contains an actuator 30, e.g., in the form of a stepping motor with a downstream planetary gearing, and a tension cable 32 coupled with the extension arm 15 for a swiveling movement of the same. The tension cable contains a spring-loaded device 36 drawn up by the actuator 30 and acting on this against a swiveling of the extension arm 15. The rotation movement of the actuator 30 is transferred by a pivoted collecting ring 37 surrounding the first part 13 of the exhaust nozzle bell 12 in the circumferential direction, around which ring the tension cables 32 are placed and are changeable in their effective length during the rotation of the same.

In the exemplary embodiment shown in FIG. 2 for the movement of the second part 14 of the exhaust nozzle bell 12 from the stowed position I into the operating position II as second activating device a rope drum or cable drum 23 is provided driven by the actuator 20 and for the purpose of a drive or transport, tension cables 25 are provided wound on the rope drum 23 and preferably distributed evenly over the circumference of the exhaust nozzle bell 12, which tension cables are coupled with their free end in the front area with the second part 14 of the exhaust nozzle bell 12. Each tension cable 25 is guided via a deflection roll 24 in the direction of the front side of the second part 14 of the exhaust nozzle bell 12. When the actuator 20 is activated, thus on the one hand a swiveling in of the extension arm 15 is effected via the gearing 21 and the transport screw 22 and on the other hand a translatory movement of the second part 14 of the exhaust nozzle bell is effected via the rope drum 23 and the tension cable 25. To synchronize the two movements, the rope drum 23 comprises an integrated mechanism for length compensation.

In the second exemplary embodiment shown in FIG. 3, tension cables 35 are provided with the collecting ring 37 and wound around the collecting ring 37 and changeable in their effective length during rotation of the collecting ring 37, preferably evenly distributed over the circumference of the exhaust nozzle bell 12. The tension cables are coupled on their free end with a front area of the second part 14 of the exhaust nozzle bell 12. During the rotation of the collecting ring by the actuator 30 a swiveling in of the extension arms 15 via the tension cable 32 is thus effected and a translatory movement of the second part 14 of the exhaust nozzle bell 12 is effected via the tension cable 35. Here additional structure is also provided to synchronize the two mentioned movements with one another. The actuator 30 thus forms a central drive for the collecting ring 37. Preferably the actuator 30 is provided in a redundant manner.

In the exemplary embodiments described, as can be clearly seen in particular from FIGS. 2 and 3, the extension arms 15 are embodied in the form of triangular guides that are embodied tapering from their first end, thus supported on the hinged axle 18, to their second end, thus facing the inside of the second part 14 of the exhaust nozzle bell 12.

For a longitudinal guidance of the second part 14 of the exhaust nozzle bell 12 on the last part of the extension movement from the stowed position I into the operating position II, guide devices are provided coupled between the first part 13 and the second part 14 of the exhaust nozzle bell 12, which guide devices comprise guide rollers or sliders 40 mounted on the inside of the front end of the second part 14 of the exhaust nozzle bell 12, and guide rails 41 mounted on the support structure 16a, 17a on the outside of the first part 13 of the exhaust nozzle bell 12, which guide rails are used to accept and guide the guide rollers or sliders 40.

Figure 5:
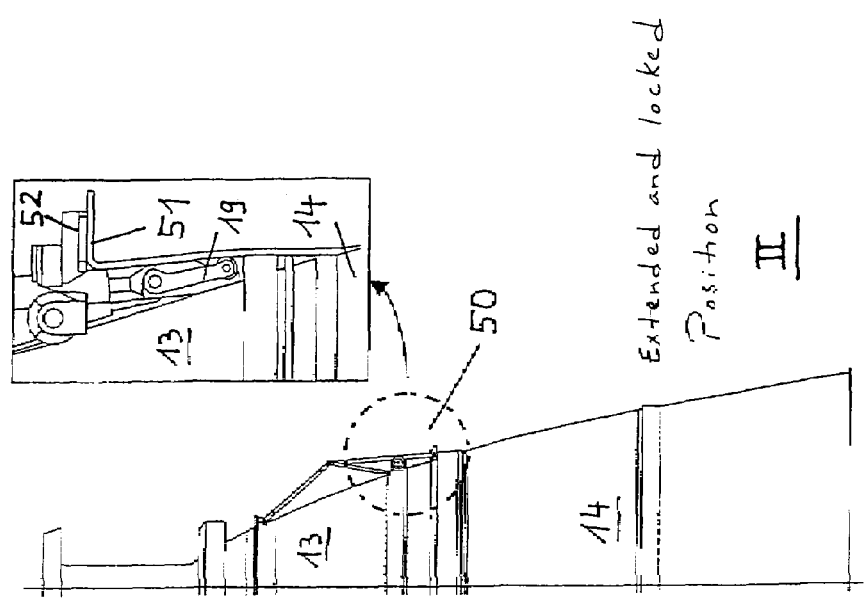
FIG. 5 shows a detailed representation of a locking device for locking both parts of the extendible exhaust nozzle bell of the first exemplary embodiment of the invention in the operating position II.

To lock the second part 14 of the exhaust nozzle bell 12 to the first part 13 in the extended operating position II, a locking device 50 shown in further detail in FIG. 5. The locking device comprises a stop 51 provided on the second part 14 and a latch 52 provided on the first part 13. After the operating position II is reached, the stop 51 is locked by the latch 52, so that the second part 14 of the exhaust nozzle bell 12 is secured against a forward movement out of the operating position II, such as would be caused by the thrust of the emerging combustion gases.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An extendible exhaust nozzle bell for a rocket engine of one of an aircraft and spacecraft comprising:
   a first part, having a quasi-conical shape, fixedly arranged on a motor of the rocket engine;
   a second, having a quasi-conical shape with a greater diameter than the first part, arranged in a flexible manner with respect to the first part;
   the second part having a stowed position in which the second part surrounds the first part and is positioned closer to the motor, and an operating position in which the first part and the second part form a continuous shape and the second part is arranged farther from the motor; and
   an extension mechanism structured and arranged to extend the second part from the stowed position to the operating position, the extension mechanism comprising a plurality of swiveling extension arms distributed over a circumference of the first part, and coupled between the first part and the second part, wherein the extension arms have first and second ends, such that the first ends are hingedly connected to a support structure provided on an outside of the first part; and wherein the second ends are displaceably arranged with respect to an inside of the second part and configured to be swivelable while reducing a radial distance of the second ends to the first part.

2. The exhaust nozzle bell according to claim 1, wherein the second part is extended in a direction of the operating position during swiveling of the extension arms to the first part,
wherein the second ends of the extension arms follow the quasi-conical shape of the second part.

3. The exhaust nozzle bell according to claim 1, wherein the extension arms comprise one of a sliding and rolling element on an end facing the second part,
wherein the sliding and rolling element is structured and arranged for a sliding or rolling movement with respect to an inside of the second part while swiveling the extension arms during the extension of the second part.

4. The exhaust nozzle bell according to claim 1, wherein the extension arms are supported on the first end about a hinged axle arranged in a circumferential direction of the exhaust nozzle bell and are configured to be swiveled in a radial plane containing a longitudinal axis of the rocket engine.

5. The exhaust nozzle bell according to claim 1, further comprising:
a first activating device, coupled with the extension arms, structured and arranged for swiveling the extension arms; and
a second activating device, coupled with the second part, structured and arranged to move the exhaust nozzle bell in the longitudinal direction of the rocket engine from the stowed position into the operating position.

6. The exhaust nozzle bell according to claim 5, wherein the first activating device contains an actuator and a tension cable driven by the actuator and coupled with the extension arm for a swiveling movement of the extension arm, and a spring-loaded device acting against a tension of the tension cable on the extension arm.

7. The exhaust nozzle bell according to claim 5, wherein the second activating device contains an actuator, a rope drum driven by the actuator, and a tension cable, the tension cable being wound on the rope drum and coupled with the second part.

8. The exhaust nozzle bell according to claim 5, wherein at least one of the first and second activating devices comprises a pivoted collecting ring surrounding the first part in the circumferential direction that can be driven by an actuator for a rotation of the collection ring, and tension cables positioned around the collecting ring, the tension cables having a changeable effective length during the rotation of the collecting ring, and which are coupled with the extension arms or the second part.

9. The exhaust nozzle bell according to claim 8, wherein the collecting ring further comprises a central drive.

10. The exhaust nozzle bell according to claim 5, wherein the first activating device contains an actuator and a transport screw driven by the actuator and coupled with the extension arm for a swiveling movement of the extension arm to change an effective length.

11. The exhaust nozzle bell according to claim 1, wherein the extension arms are configured as triangular guides tapering from a first end towards a second end.

12. The exhaust nozzle bell according to claim 1, wherein guide devices structured and arranged for a longitudinal guiding of the second part on a last part of an extension movement from the stowed position into the operating position are coupled between the first part and the second part.

13. The exhaust nozzle bell according to claim 12, wherein the guide devices comprise one of guide rollers and sliders mounted on a front end of the second part and guide rails mounted on a support structure on the first part to accept and guide one of the guide rollers and sliders.

14. An exhaust nozzle bell for a rocket engine comprising:
a first part fixedly arranged on a motor of the rocket engine;
a second part displaceably coupled to the first part;
the second part having a stowed position in which the second part surrounds the first part and is positioned closer to the motor, and an operating position in which the first part and the second part form a continuous shape and the second part is arranged farther from the motor; and
an extension mechanism structured and arranged to extend the second part from the stowed position to the operating position, the extension mechanism comprising a plurality of swiveling extension arms, wherein the extension arms have first and second ends,
wherein each of the extension arms comprise one of a sliding and rolling element on an end facing the second part, and the sliding and rolling element is structured and arranged for a sliding or rolling movement with respect to an inside of the second part.

15. The exhaust nozzle bell according to claim 14, wherein the extension arms are supported on a first end about a hinged axle arranged in a circumferential direction and are configured to be swiveled in a radial plane containing a longitudinal axis of the rocket engine.

16. The exhaust nozzle bell according to claim 14, further comprising:
a first activating device, coupled with the extension arms, structured and arranged for swiveling the extension arms; and
a second activating device, coupled with the second part, structured and arranged to move the exhaust nozzle bell in the longitudinal direction of the rocket engine from the stowed position into the operating position.

17. The exhaust nozzle bell according to claim 16, wherein the first activating device contains an actuator and a transport screw driven by the actuator and coupled with the extension arm for a swiveling movement of the extension arm to change an effective length.

18. The exhaust nozzle bell according to claim 16, wherein the first activating device contains an actuator and a tension cable driven by the actuator and coupled with the extension arm for a swiveling movement of the extension arm, and a spring-loaded device acting against a tension of the tension cable on the extension arm.

19. The exhaust nozzle bell according to claim 16, wherein the second activating device contains an actuator, a rope drum driven by the actuator, and a tension cable, the tension cable being wound on the rope drum and coupled with the second part.

20. The exhaust nozzle bell according to claim 16, wherein at least one of the first and second activating devices comprises a pivoted collecting ring surrounding the first part in the circumferential direction that can be driven by an actuator for a rotation of the collection ring, and tension cables positioned around the collecting ring, the tension cables having a changeable effective length during the rotation of the collecting ring, and which are coupled with the extension arms or the second part.

21. The exhaust nozzle bell according to claim 20, wherein the collecting ring further comprises a central drive.

22. The exhaust nozzle bell according to claim 14, wherein the extension arms are configured as triangular guides tapering from a first end towards a second end.

23. The exhaust nozzle bell according to claim 14, wherein guide devices structured and arranged for a longitudinal guiding of the second part on a last part of an extension movement from the stowed position into the operating position are coupled between the first part and the second part.

24. The exhaust nozzle bell according to claim 23, wherein the guide devices comprise one of guide rollers and sliders mounted on a front end of the second part and guide rails mounted on a support structure on the first part to accept and guide one of the guide rollers and sliders.

* * * * *